United States Patent
Lin et al.

(10) Patent No.: US 8,503,585 B2
(45) Date of Patent: Aug. 6, 2013

(54) DECODING METHOD AND ASSOCIATED APPARATUS

(75) Inventors: Tung-Sheng Lin, Hsinchu Hsien (TW); Tien Hsin Ho, Hsinchu Hsien (TW); Shao-Ping Hung, Hsinchu Hsien (TW); Ching-Hsiang Chuang, Hsinchu Hsien (TW); Yu-Hsien Ku, Hsinchu Hsien (TW)

(73) Assignee: MStar Semiconductor, Inc. (TW)

( * ) Notice: Subject to any disclaimer, the term of this patent is extended or adjusted under 35 U.S.C. 154(b) by 346 days.

(21) Appl. No.: 12/891,408

(22) Filed: Sep. 27, 2010

(65) Prior Publication Data

US 2011/0090994 A1    Apr. 21, 2011

(30) Foreign Application Priority Data

Oct. 16, 2009   (TW) .............................. 98135168 A

(51) Int. Cl.
*H04L 27/06* (2006.01)
*H03M 13/03* (2006.01)

(52) U.S. Cl.
USPC .......................................... 375/341; 714/795

(58) Field of Classification Search
USPC ................................... 375/340, 341; 714/795
See application file for complete search history.

(56) References Cited

U.S. PATENT DOCUMENTS

| | | | | |
|---|---|---|---|---|
| 5,928,378 | A | * | 7/1999 | Choi .............................. 714/795 |
| 7,194,047 | B2 | * | 3/2007 | Strolle et al. .................. 375/341 |
| 2002/0126776 | A1 | * | 9/2002 | Muck et al. .................... 375/341 |

* cited by examiner

*Primary Examiner* — Khai Tran
(74) *Attorney, Agent, or Firm* — Han IP Law PLLC

(57) ABSTRACT

A decoding method for determining a preferred survivor path in a decoding process is provided. The method includes calculating a first determination value of a first survivor path at a first time point, the first determination value being determined by a first sub determination value and a second determination value at a second time point, and the second time point being prior to the first time point; calculating a third determination value of a second survivor path at the first time point, the third determination value being determined by a second sub determination value and a fourth determination value at the second time point; and when a difference between the first determination value and the third determination value is equal to or less than a predetermined value, determining the preferred survivor path at the first time point according to the second and the fourth determination values, or the first and the second sub determination values.

19 Claims, 8 Drawing Sheets

DECODING METHOD AND ASSOCIATED APPARATUS

CROSS REFERENCE TO RELATED PATENT APPLICATIONS

This patent application claims priority from Taiwan Patent Application No. 098135168, filed in the Taiwan Patent Office on Oct. 16, 2009, entitled "Decoding Method and Associated Apparatus", and incorporates the Taiwan patent application in its entirety by reference.

TECHNICAL FIELD

The present disclosure relates to a decoding method and associated apparatus, and more particularly to a decoding method and associated apparatus for determining a preferred survivor path in a decoding process.

BACKGROUND OF THE PRESENT DISCLOSURE

In a communication system, a transmitter transmits the communication signal to a remote receiver, in a way that fading and errors of the communication signal are often caused in a wireless transmission channel. Hence, the communication signal first need be convolutionally encoded before being transmitted to the remote receiving end. The receiving end receives the convolutionally encoded communication signal and then performs convolutional decoding to obtain the communication signal, so as to reduce signal errors through the convolutional encoding/decoding process. The convolutional encoding is a channel encoding by a channel encoder. The output of codeword in the channel encoding is not only related to the present inputted information bit, but also affected by the previous inputted information bits, i.e., the codeword has memory. In general, the convolutional code has three parameters (n, k, m). That is, each k information bits generate n-bit codeword, and the output of the n-bit codeword is determined by the previous m information bits and the present inputted k information bits, wherein the ratio R=k/n is called the code rate that represents the information of each codeword, and m is defined as a memory order that represents the storage time unit of the inputted information bits in the encoder, i.e. the register number the encoder needs. The higher memory order is, the higher the correcting ability for the convolutional coding gets. Another frequently used coefficient is a constraint length. For a k=1 encoder, the constraint length can be represented as K=m+1 to represent the maximum bit number affected by the output bits of the encoder.

The convolutional encoder can be viewed as a finite state machine. The convolutional encoder uses a state diagram to describe its input/output relation, and all states are defined by the content in the shift register in the encoder.

FIG. 1A is a state diagram of a conventional (2, 1, 2) convolutional code. FIG. 1B is a trellis diagram of a conventional (2, 1, 2) convolutional code. A (2, 1, 2) convolutional encoder has the memory order m=2, and hence it has $2^2=4$ states. For example, its state diagram is as FIG. 1A, and the corresponding state transition per unit time can be further represented by a trellis diagram as FIG. 1B by expanding the state diagram.

From a trellis diagram, the path and the corresponding codeword for each inputted information sequence are observed. For example, state $S_0$ is changed to state $S_0$ or state $S_1$ by inputting an information bit 0 or 1. The outputted codeword is related to not only the present state, but also the inputted information bit. At the receiving end, the codeword transmitted can be identified through the receiving sequence and the trellis diagram—such identification process is called decoding.

Numerous conventional decoding algorithms for the convolutional encoding are proposed, and among the available decoding algorithms, Viterbi algorithm is a likelihood decoding algorithm that achieves more satisfactory efficiency. In the following description, a (2, 1, 2) convolutional code is taken for example to illustrate how the convolutional code is decoded by the Viterbi algorithm. First some terms are defined. The distance between two codewords represents the number of unequal bits of two codewords. For example, the distance between (1 0) and (0 1) is 2, and the distance between (1 1) and (0 1) is 1. The branch metric represents the distance between the receiving sequence and the branch codeword. At time T=t, the branch metric from state $S_i$ to $S_j$ is denoted as $BM_{i,j,t}$. The accumulated path metric represents the minimum value of the sum of all the branch metrics to state $S_j$ till T=t, and is denoted as $S_1$. The survivor path represents the path entering the state with the minimum accumulated branch metric after decoding.

Suppose the initial state is at $S_0$, time starts from T=0, and the transmitting information sequence is u=(0,1,0,1,0). After the (2, 1, 2) convolutional encoder, the codeword v=(00, 11, 10, 00, 10, 11, 00) is obtained. Influenced by the binary symmetric channel, the receiving codeword sequence is r=(00, 11, 10, 00, 10, 11, 10), wherein one bit represented in boldface is incorrect.

FIG. 2 is a trellis diagram of the conventional Viterbi algorithm. In FIG. 2, states $S_0, S_1, S_2$ and $S_3$ are arranged from the bottom to the top, the dotted line is the path with an input of 0, the straight line is the path with an input of 1, and the codeword on the path is the branch codeword. When decoding, from state $S_0$ to state $S_0$ and $S_1$, one calculates the branch metrics, $BM_{0,0,0}=0$ and $BM_{0,1,0}=2$. The bolder path is the survivor path of each state at the time T=5. The value beside the state is the accumulated path metric of the state at that time. The boldest path is the preferred survivor path ($PM_{2,5}=0$) when the decoding process is finished at the time T=5. By back-tracing the survivor path, the original information sequence u=(0, 1, 0, 1, 0, 0, 0) can be obtained. The last two zeros are used to recover the content of the register to state $S_0$ after decoding so that the next decoding process can be started from the state $S_0$.

However, the prior art does not mention a solution for a situation where the accumulated path metric is similar or equal. If one of the survivor paths is determined directly instead of specifically attending such situation, opportunities of the other paths are denied to likely result in decoding errors. Therefore, it is urgently needed a decoding method and associated apparatus for solving issues of equal or similar accumulated path metrics.

SUMMARY OF THE PRESENT DISCLOSURE

It is one of the objectives of the present disclosure to provide a decoding method and associated apparatus for determining a preferred survivor path in a decoding process. When the preferred survivor path cannot be determined according to the present accumulated path metric, the prior accumulated path metric or the branch metric is used to determine the preferred survivor path to achieve the object of correct decoding.

The present disclosure provides a decoding method for determining a preferred survivor path in a decoding process. The decoding method comprises: calculating a first determination value of a first survivor path at a first time point, the first determination value being determined by a first sub determination value and a second determination value at a second time point, and the second time point being prior to the first time point; calculating a third determination value of a second survivor path at the first time point, the third determination value being determined by a second sub determination value and a fourth determination value at the second time point; and when a difference between the first determination value and the third determination value is equal to or less than a predetermined value, determining the preferred survivor path at the first time point according to the second and the fourth determination value, or the first and the second sub determination values.

The present disclosure further provides a decoding apparatus for determining a preferred survivor path according to a plurality of accumulated path metrics and a plurality of branch metrics. The decoding apparatus comprises: an adder, comprising a plurality of adding units, for generating a plurality of calculating results according to the accumulated path metrics and the branch metrics; a comparator, comprising a plurality of comparison units, coupled to the adder, for receiving the branch metrics and generating at least one selection signal according to the calculating results and the branch metrics; and a selector, coupled to the comparator, for selecting one path as the preferred survivor path from a first survivor path and a second survivor path according to the selection signal; wherein, when the difference of the calculation results is smaller than or equal to a predetermined value, the selection signal instructs the selector to output one path having the larger branch metric as the preferred survivor path from the first survivor path and the second survivor path.

The present disclosure further provides a decoding apparatus for determining a preferred survivor path according to a plurality of accumulated path metrics and a plurality of branch metrics. The decoding apparatus comprises: an adder, comprising a plurality of adding units, for generating a plurality of calculating results according to the accumulated path metrics and the branch metrics; a comparator, comprising a plurality of comparison units, coupled to the adder, for receiving the branch metrics and generating at least one selection signal according to the calculating results and the branch metrics; and a selector, coupled to the comparator, for selecting one path as the preferred survivor path from a first survivor path and a second survivor path according to the selection signal; wherein, when the difference of the calculation results is smaller than or equal to a predetermined value, the selection signal instructs the selector to output one path having the smaller accumulated path metric as the preferred survivor path from the first survivor path and the second survivor path.

The present disclosure further provides a preferred way in decoding to determine a survivor path when the difference in accumulated path metrics is less than or equal to a predetermined value. If one of the survivor paths is determined directly instead of properly handling such situation, possibilities of the other paths being selected as the survivor path are eliminated such that decoding errors may be resulted.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF THE PREFERRED EMBODIMENTS

Figure 1A:
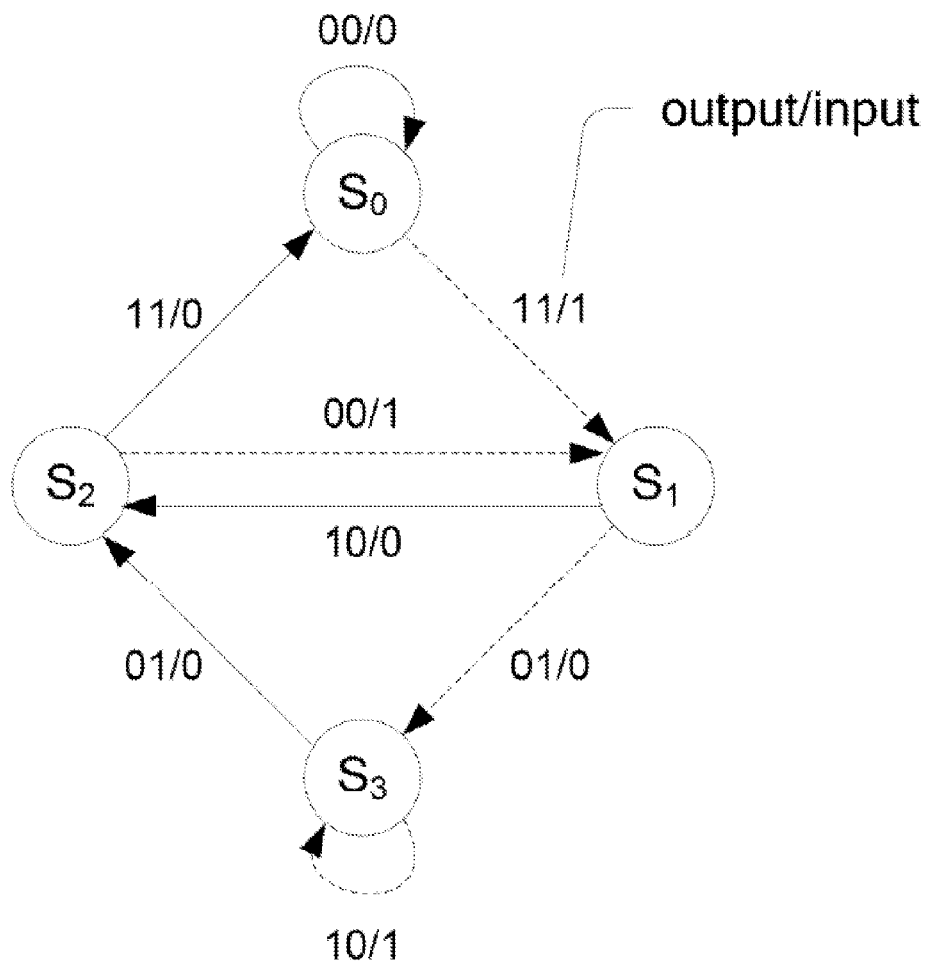
FIG. 1A is a state diagram of a conventional (2, 1, 2) convolutional code.
Figure 1B:
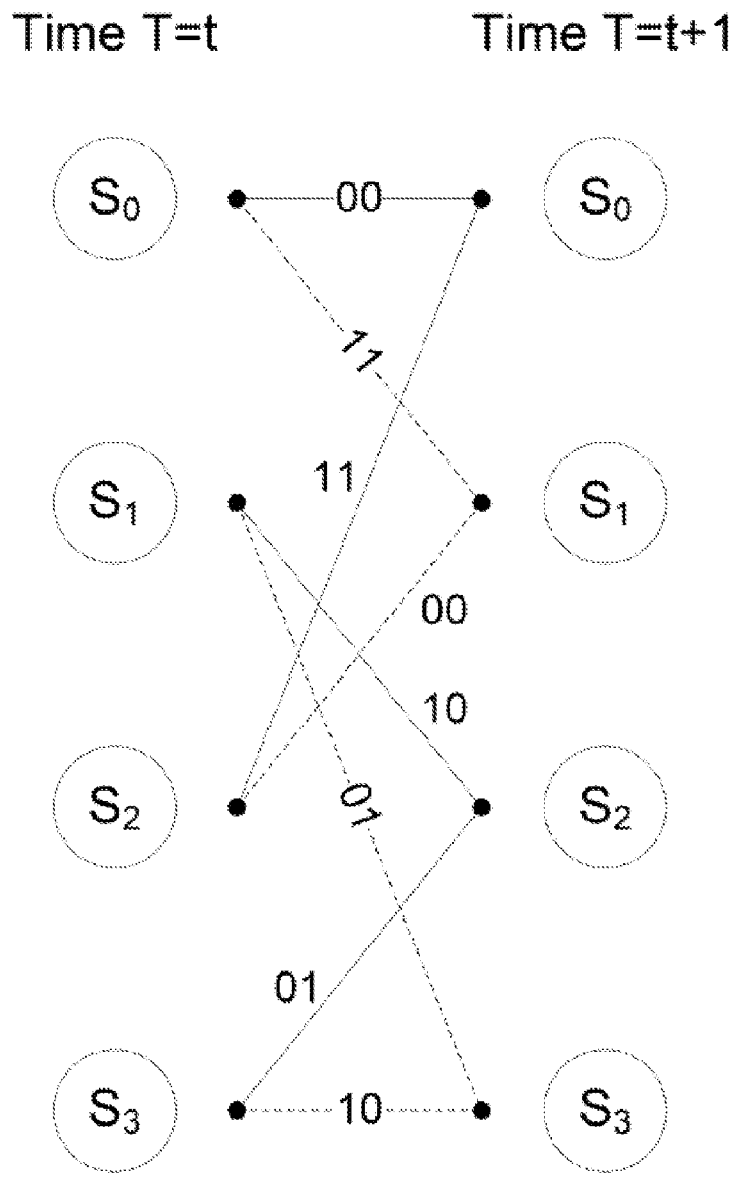
FIG. 1B is a trellis diagram of a conventional (2, 1, 2) convolutional code.
Figure 2:
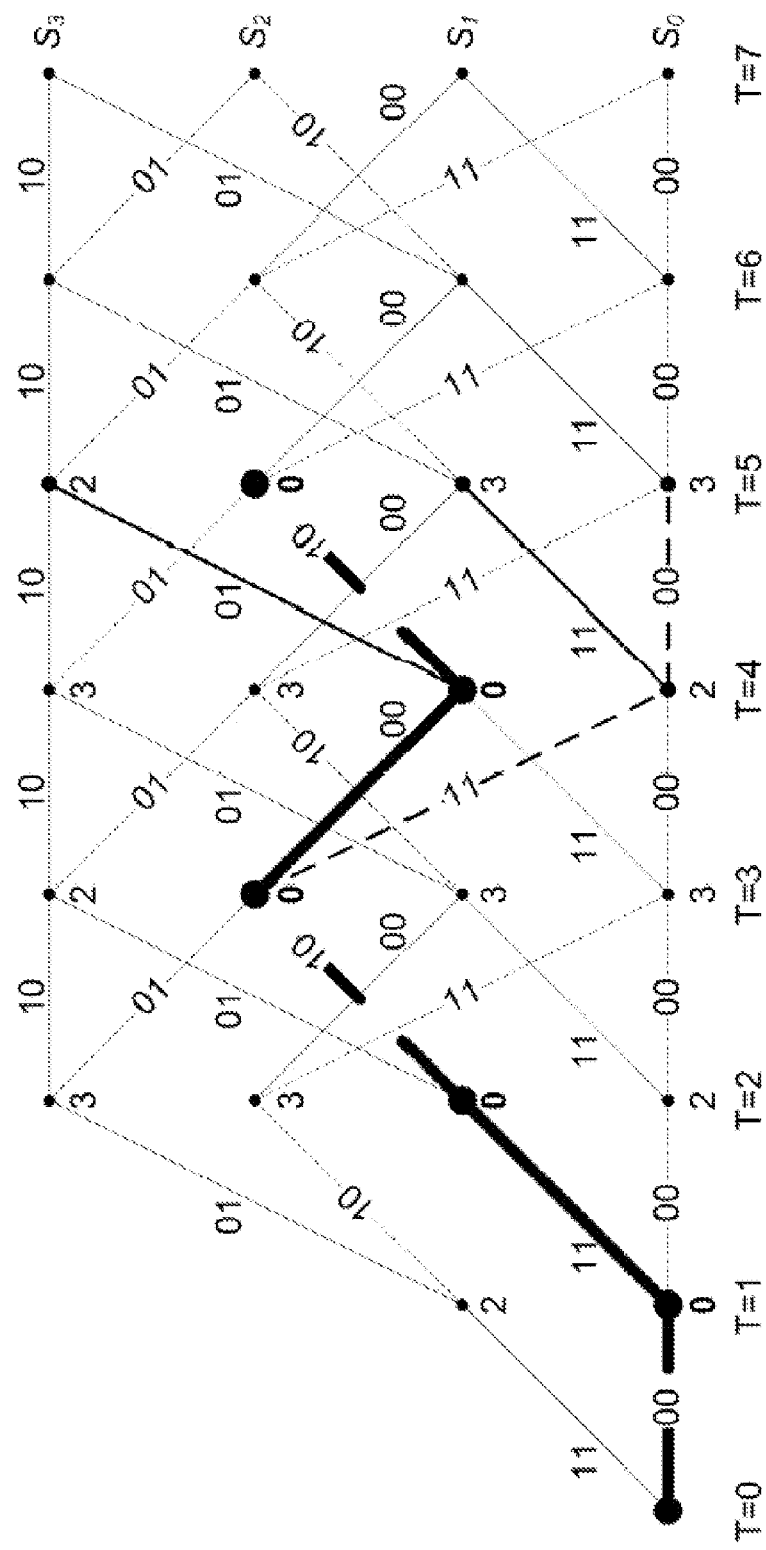
FIG. 2 is a trellis diagram of conventional Viterbi algorithm.
Figure 3:
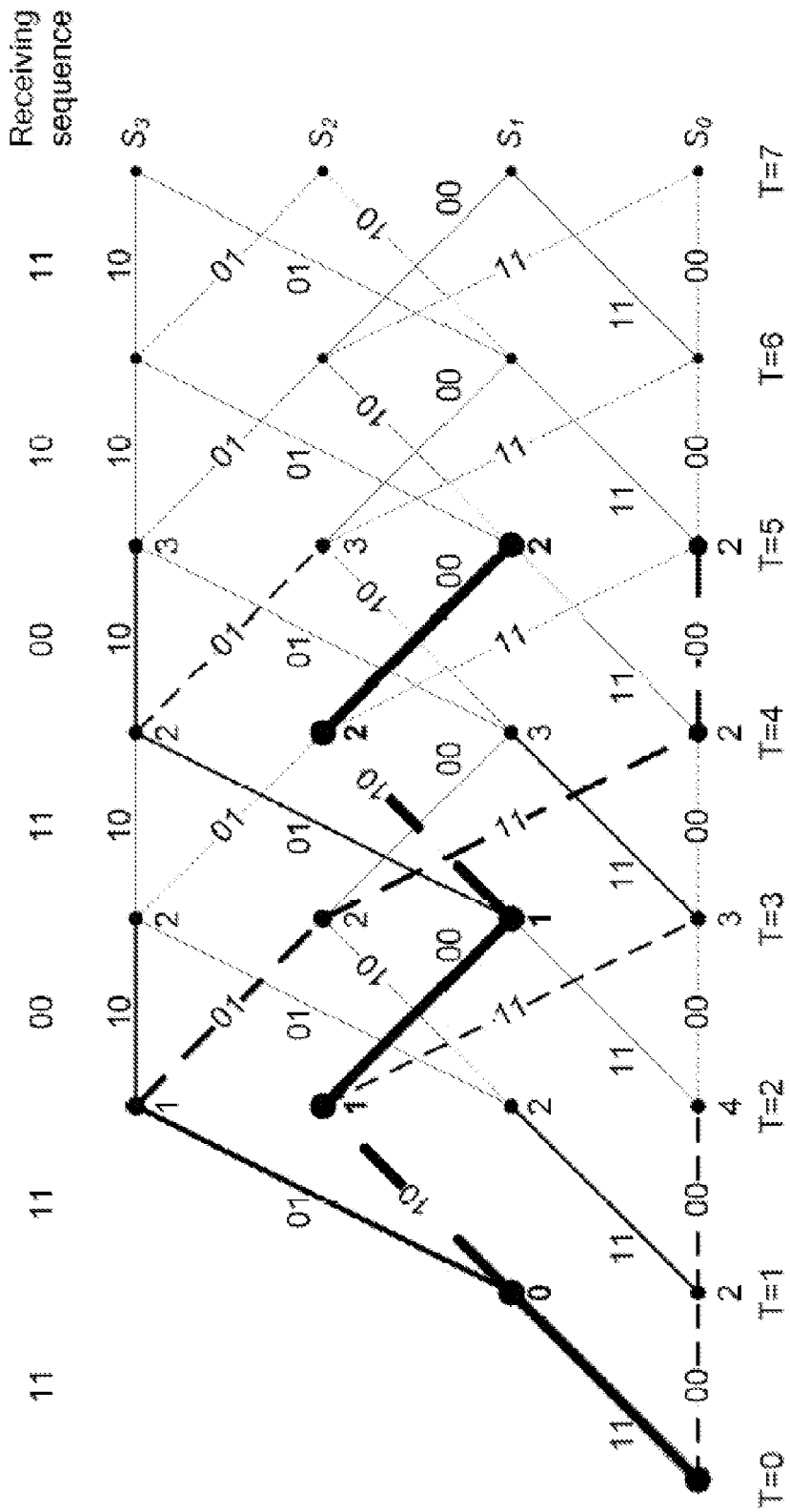
FIG. 3 is a trellis diagram according to one embodiment of the present disclosure.

FIG. 3 is a trellis diagram according to one embodiment of the present disclosure. In FIG. 3, states $S_0$, $S_1$, $S_2$ and $S_3$ are arranged from the bottom to the top, the dotted line is the path with an input of 0, the straight line is the path with an input of 1, and the codeword on the path is the branch codeword. Suppose the initial state is at $S_0$, time starts from T=0, and the transmitting information sequence is u=(1,0,1,0,1). After the (2, 1, 2) convolutional encoder, the codeword v=(11, 10, 00, 10, 00, 10, 11) is obtained. Influenced by the binary symmetric channel, the receiving codeword sequence is r=(11, 11, 00, 11, 00, 10, 11), wherein two bits in boldface are incorrect.

To decode, state $S_0$ and $S_1$ are proceeded from state $S_0$, and the branch metrics $BM_{0,0,0}=2$ and $BM_{0,1,0}=0$ are calculated. The bolder path is the survivor path of each state at the time T=5. The value beside the state is the accumulated path metric of the state at that time, and the boldest path is the preferred survivor path when the decoding process is finished at time T=5. By back-tracing the survivor path, the original information sequence u=(1, 0, 1, 0, 1, 0, 0) can be obtained. The last two zeros are used to recover the content of the register to state $S_0$ after decoding so that the next decoding process can be started from the state $S_0$. Following is the detailed description.

When T=1, the branch metrics of all states, $BM_{0,0,0}=2$ and $BM_{0,1,0}=0$, are calculated. At the initial state, $PM_{0,1}=BM_{0,0,0}=2$ and $PM_{1,1}=BM_{0,1,0}=0$, and the survivor paths are recorded. At the time T=1, there is only one path to arrive each state, so the paths are the survivor paths to each corresponding state. When T=2, the branch metrics of all states, $S_0$, $S_1$, $S_2$ and $S_3$, are calculated as $BM_{0,0,1}=2$, $BM_{0,1,1}=0$, $BM_{1,2,1}=1$ and $BM_{1,3,1}=1$. Then, the accumulated path metrics of all states, $S_0$, $S_1$, $S_2$ and $S_3$, are calculated as follows:

$$PM_{0,2}=PM_{0,1}+BM_{0,0,1}=2+2=4,$$

$$PM_{1,2}=PM_{0,1}+BM_{0,1,1}=2+0=2,$$

$$PM_{2,2}=PM_{1,1}+BM_{1,2,1}=0+1=1, \text{ and}$$

$$PM_{3,2}=PM_{1,1}+BM_{1,3,1}=0+1=1.$$

The survivor paths are recorded. At the time T=2, there is only one path to arrive each state, too, which is the survivor path. When T=3, there are two paths reaching each state. The branch metrics of all states, $S_0$, $S_1$, $S_2$ and $S_3$, are calculated, $BM_{0,0,2}=0$, $BM_{0,1,0}=2$, $BM_{1,2,2}=1$, $BM_{1,3,2}=1$, $BM_{2,0,2}=2$, $BM_{2,1,2}=0$, $BM_{3,2,2}=1$ and $BM_{3,3,2}=1$. Then, the minimal accumulated path metrics of all states are calculated as follows:

$$PM_{0,3}=PM_{2,2}+BM_{2,0,2}=1+2=3,$$

$$PM_{1,3}=PM_{2,2}+BM_{2,1,2}=1+0=1,$$

$$PM_{2,3}=PM_{3,2}+BM_{3,2,2}=1+1=2, \text{ and}$$

$$PM_{3,3}=PM_{3,2}+BM_{3,3,2}=1+1=2.$$

The survivor paths are recorded. When T=4, the above calculation is repeated. The branch metrics of all states are calculated, as $BM_{0,0,3}=2$, $BM_{0,1,3}=0$, $BM_{1,2,3}=1$, $BM_{1,3,3}=1$, $BM_{2,0,3}=0$, $BM_{2,1,3}=2$, $BM_{3,2,3}=1$ and $BM_{3,3,3}=1$. Then, the minimal accumulated path metrics of all states are calculated, as $PM_{0,4}=2$, $PM_{1,4}=3$, $PM_{2,4}=2$ and $PM_{3,4}=2$, and the survivor paths are recorded. When T=5, the above calculation is repeated again. The branch metrics of all states are calculated, as $BM_{0,0,4}=0$, $BM_{0,1,4}=2$, $BM_{1,2,4}=1$, $BM_{1,3,4}=1$, $BM_{2,0,4}=2$, $BM_{2,1,4}=0$, $BM_{3,2,4}=1$ and $BM_{3,3,4}=1$. Then, the minimal accumulated path metrics of all states are calculated, as $PM_{0,5}=2$, $PM_{1,5}=2$, $PM_{2,5}=3$ and $PM_{3,5}=3$, and the survivor paths are recorded.

Figure 4:
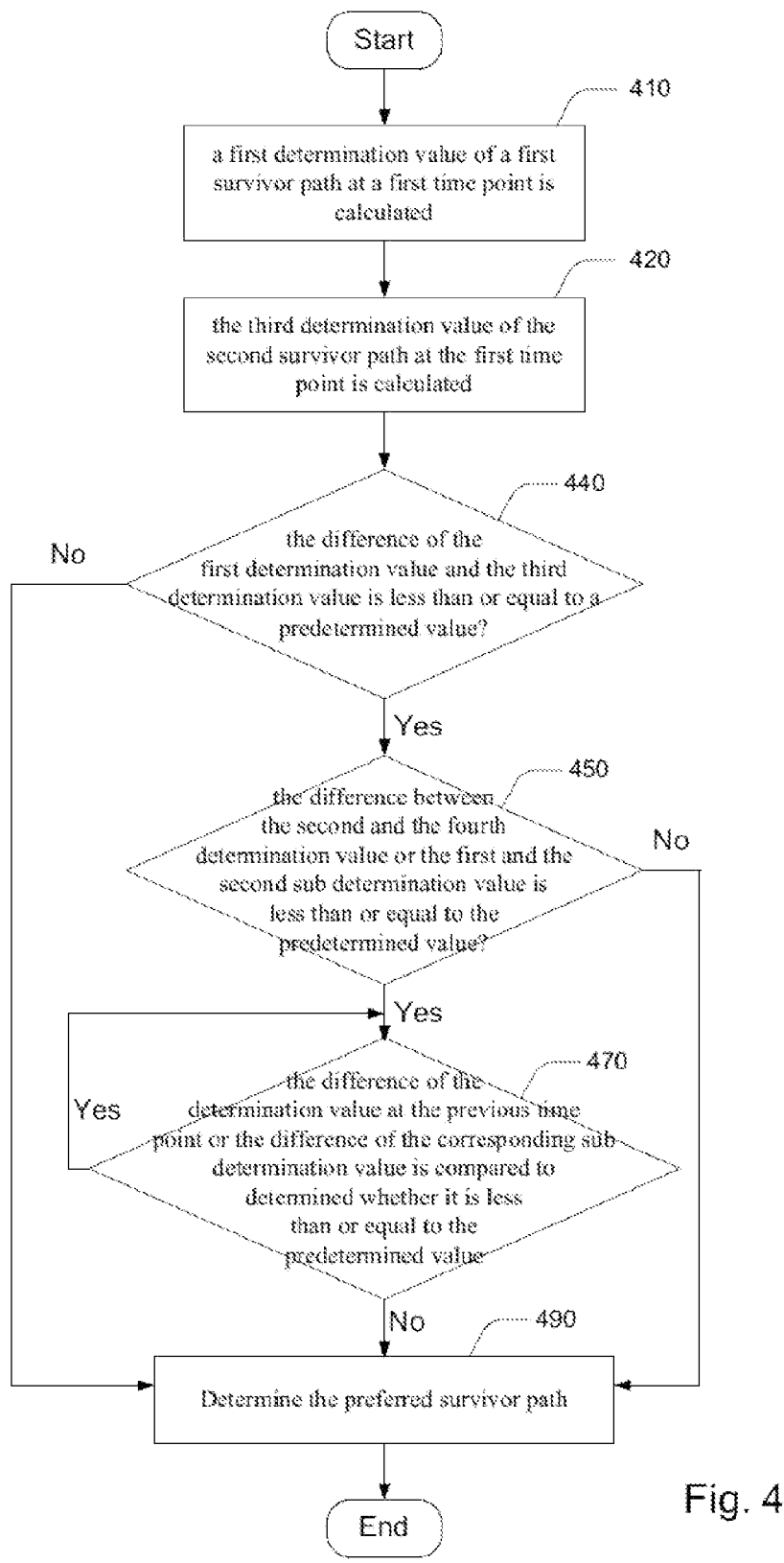
FIG. 4 is a flowchart according to one embodiment of the present disclosure.

FIG. 4 is a flowchart according to one embodiment of the present disclosure determining a preferred survivor path from the last survivor paths at the last stage in the decoding process. FIG. 3 is also referenced here. In Step 410, a first determination value of a first survivor path at a first time point is calculated. The first determination value can be decided by a first sub determination value of a second determination value at a second time point, and the second time point is prior to the first time point. For example, the first and second determination values can be the accumulated path metrics, the sub determination value can be the branch metric, and the second time point can be a previous time point of the first time point. For example, the first time is T=t, and the second time point is T=t−1. In Step 420, the third determination value of the second survivor path at the first time point is calculated, and the third determination value is determined by the second sub determination value and the fourth determination value at the second time point. For example, the third and the fourth determination values can be accumulated path metrics, and the second sub determination value can be the branch metric.

In Step 440, it is determined whether the difference between the first and the third determination value is less than or equal to a predetermined value. The predetermined value equals 0, 1, 2, ..., for example. In a preferred embodiment according to the present disclosure, the predetermined value can be zero. When T=5, the minimal accumulated path metric (the first determination value) of state $S_0$ and the minimal accumulated path metric (the third determination value) of state $S_1$ are both 2. Next, the method proceeds to Step 450, in which it is determined whether the difference between the second and the fourth determination value or the first and the second sub determination value is less than or equal to the predetermined value. That is, when the difference between the first determination value and the third determination value is less than or equal to the predetermined value, according to the second and the fourth determination value, or the first and the second sub determination value, a preferred survivor path at the first time point is determined. For example, the path with the smaller determination value within the second determination value and the fourth determination value is chosen to be the preferred survivor path, or, the path with the larger determination value within the first sub determination value and the second sub determination value is chosen to be the preferred survivor path. In this embodiment, the second determination value ($PM_{0,4}$) and the fourth determination value ($PM_{2,4}$) both equal 2. Because of the equality, Step 470 is entered, in which, according to the time sequence prior than the present time point, the difference of the determination value at the previous time point (T=3) or the difference of the corresponding sub determination value is compared to determined whether it is less than or equal to the predetermined value. When the difference between the second determination value and the fourth determination value is less than or equal to the predetermined value, the sub determination value ($BM_{2,0,3}=0$) corresponding to the second determination value of the first survivor path and the sub determination value ($BM_{1,2,3}=1$) corresponding to the fourth determination value of the second survivor path are compared, alternatively, the determination value of the first survivor path at the previous time point of the second time point ($PM_{2,3}=2$) and the determination value of the second survivor path at the previous time point of the second time point ($PM_{1,3}=1$) are compared until the difference of determination values of two survivor paths at the same time point is larger than the predetermined value. In this example, the difference between $BM_{2,0,3}=0$ and $BM_{1,2,3}=1$ is 1, similarly, the difference between $PM_{2,3}=2$ and $PM_{1,3}=1$) is 1, which is larger than the predetermined value in this embodiment. The method then proceeds to Step 490 to determine the preferred survivor path. Otherwise, Step 470 is performed until the difference of the determination values of two survivor paths or the difference of the corresponding sub determination values at the same time point is larger than the predetermined value.

In Step 490, the preferred survivor path is determined according to the smaller determination value ($PM_{1,3}=1$) or the larger sub determination value ($BM_{1,2,3}=1$), which is represented by the boldest path in FIG. 3. Since the determination value at T=t equals the sum of the determination value at T=t−1 and the corresponding sub determination value, choosing the smaller determination is substantially the same as choosing the larger corresponding sub determination value. Therefore, selecting the survivor path with the smaller determination value at the previous time point or selecting the survivor path with the larger sub determination value is suitable.

By the method according to the embodiment, the correct transmitting sequence is decoded correctly. Or else, an incorrect information sequence is possibly decoded. According to the prior art, the other survivor path u'=(1, 1, 0, 0, 0, 0, 0) in this embodiment is decoded, resulting in three decoding errors that are represented in boldface. The embodiment is applicable to convolutional decoding, decoding of combinations of convolutional codes and other coding methods such as Reed-Solomon (RS) codes, or Viterbi decoding.

Figure 5:
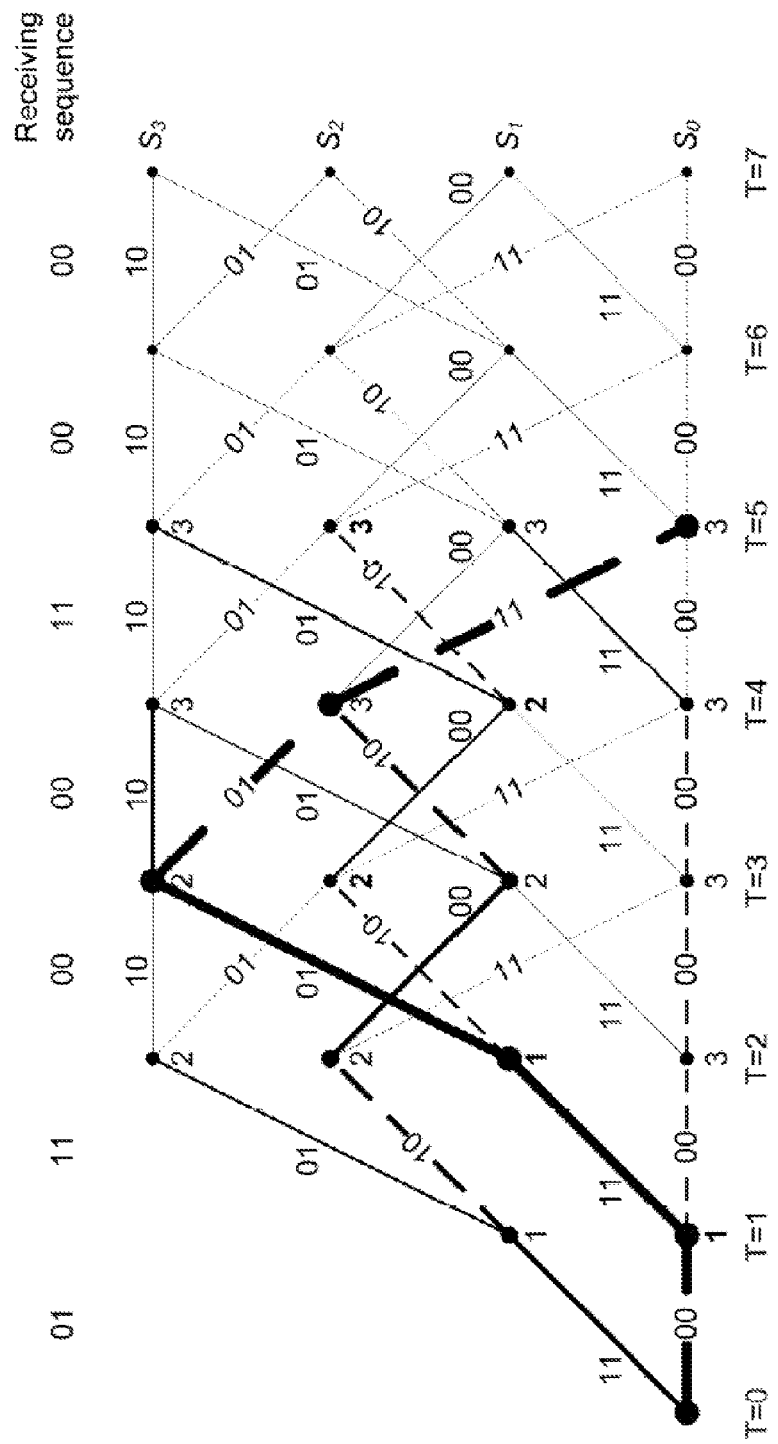
FIG. 5 is a trellis diagram of another embodiment according to the present disclosure.

The flowchart shown in FIG. 4 is also applicable for deciding a preferred survivor path from multiple survivor paths that match the decoding rule of a specific state at a specific time point in the decoding process. FIG. 5 shows a trellis diagram of another embodiment according to the present disclosure, as well as FIG. 4. For example, the transmitting information sequence is u=(0, 1, 1, 0, 0). After the (2, 1, 2) convolutional encoder, the codeword v=(00, 11, 01, 01, 11, 00, 00) is obtained. Influenced by the binary symmetric channel, the receiving codeword sequence is r=(01, 11, 00, 00, 11, 00, 00), wherein three bits represented in boldface are incorrect. Details from the time T=0 to T=3 are similar to the above description, and shall not be repeated for brevity.

At the time T=4, the determination value of state $S_2$ equals 3, which is from the two possible survivor paths reaching state $S_2$, i.e., from state $S_3$ or state $S_1$ at the previous time point (T=3), resulting from the equal sum (3) of the determination value and the corresponding sub determination value for state $S_3$ and state $S_1$ at time T=3. Thus, Step 410 is proceeded to calculate the first determination value ($PM_{1,3}+BM_{1,2,3}=2+$ 1=3) of the first survivor path at the first time point (T=4). In Step 420, the third determination value ($PM_{3,3}+BM_{3,2,3}=2+1=3$) of the second survivor path at the first time point is calculated. In Step 440, whether the difference of the first determination value and the third determination value is less than or equal to a predetermined value is determined. In a preferred embodiment, the predetermined value can be zero. Since the accumulated path metrics ($PM_{2,4}$, i.e., the first and the third determination value) of two paths reaching state $S_2$ are both 3, Step 450 is proceeded to determine the individual determination value of two survivor paths at the second time point (T=3), i.e., to determine whether the difference of the second determination value ($PM_{1,3}=2$) and the fourth determination value ($PM_{3,3}=2$), or the difference of the corresponding sub determination value, i.e., the first sub determination value ($BM_{1,2,3}=1$) and the second sub determination value ($BM_{3,2,3}=1$), is less than or equal to the predetermined value. Because of the equality again, Step 470 is performed. In Step 470, according to the time sequence, from a time point prior to the present time point, the difference of the determination value or the corresponding sub determination value at the previous time point (T=2) is compared to determine whether it is less than or equal to the predetermined value. That is, when the difference of the second determination value and the fourth determination value is less than or equal to the predetermined value, the determination value ($PM_{2,2}=2$) of the first survivor path at the previous time point (T=2) of the second time point (T=3) and the determination value ($PM_{1,2}=1$) of the second survivor path at the previous time point (T=2) of the second time point (T=3) are compared. Alternatively, the sub determination value ($BM_{2,1,2}=0$) corresponding to the determination value ($PM_{2,2}=2$) of the first survivor path at time point T=2 and the sub determination value ($BM_{1,3,2}=1$) corresponding to the determination value ($PM_{1,2}=1$) of the second survivor path at time point T=2 are compared, until the difference of the individual determination value of two survivor paths at the same time point is larger than the predetermined value. In this example, the difference of $BM_{2,1,2}=0$ and $BM_{1,3,2}=1$ is 1, and similarly, the difference of $PM_{2,2}=2$ and $PM_{1,2}=1$ is also 1, which is greater than the predetermined value, and the method then proceeds to Step 490. Otherwise, Step 470 is performed until the difference of the determination values of two survivor paths at the same time point or the corresponding sub determination value is greater than the predetermined value. In Step 490, the preferred survivor path is determined at time T=4. The smaller determination value ($PM_{1,2}=1$) is selected, or the larger corresponding sub determination value ($BM_{1,3,2}=1$) is selected as the preferred survivor path, as represented by the bolder path shown in FIG. 5.

At time T=5, the similar method is continued to find the preferred survivor path at each state, as represented by the bolder path shown in FIG. 5. When time T=5, the minimal accumulated path metrics of each state are both 3. Considering the hardware, timing and calculating cost, the minimal state $S_0$ with the minimal accumulated path metric is determined as the preferred survivor path, as represented by the boldest path in FIG. 5.

By the method according to the embodiment, the correct transmitting sequence can be decoded. Or else, an incorrect information sequence is possibly decoded at the time T=4. According to the prior art, the other survivor path u'=(1, 0, 1, 0, 0, 0, 0) in this embodiment is decoded, resulting in two decoding errors that are represented in boldface. The embodiment is applicable to convolutional decoding, decoding of combinations of convolutional codes and other coding methods such as Reed-Solomon (RS) code, or Viterbi decoding.

Figure 6:
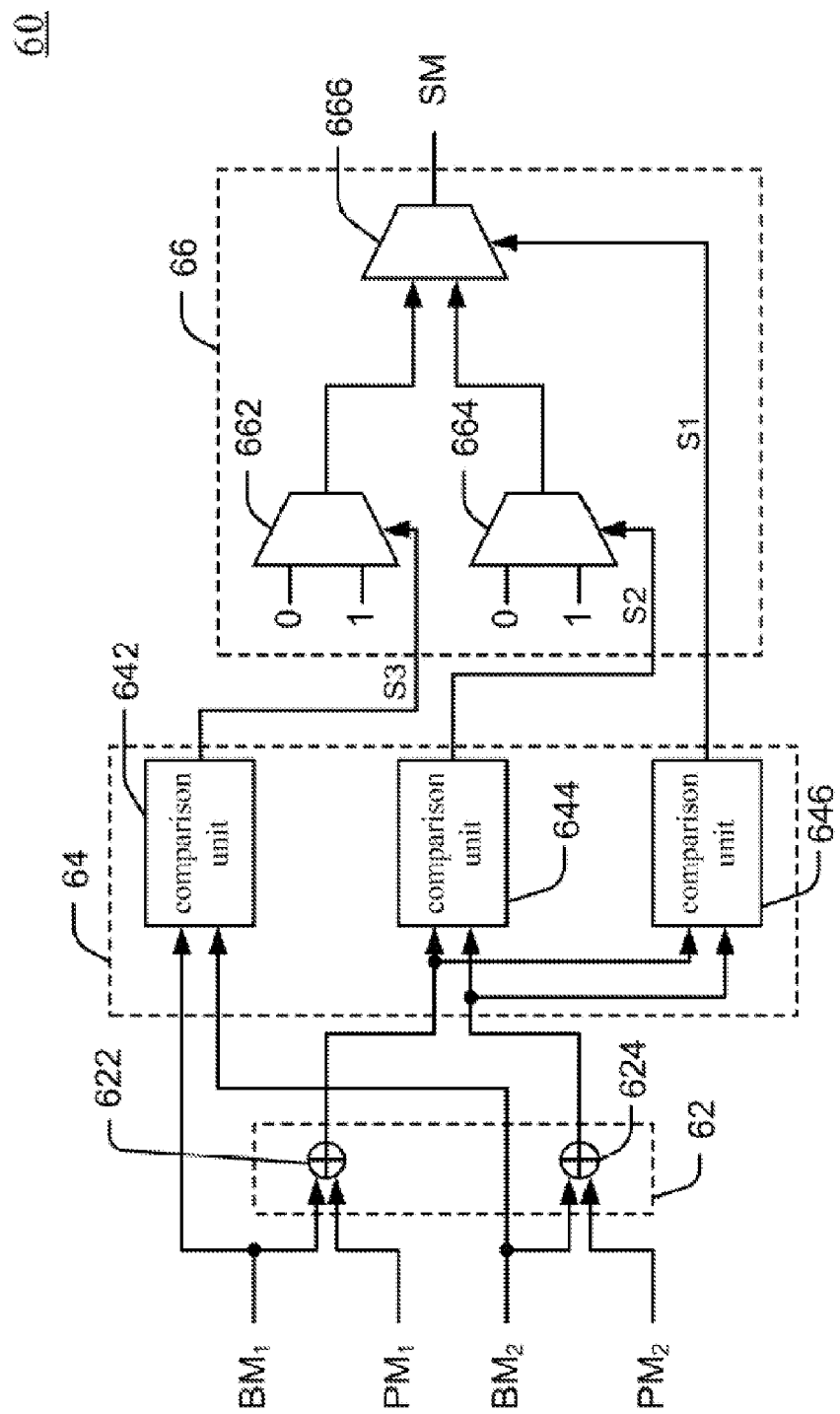
FIG. 6 is a block diagram of a decoding apparatus according to one embodiment of the present disclosure.

FIG. 6 is a block diagram of a decoding apparatus 60 according to one embodiment of the present disclosure, for determining a preferred survivor path according to a plurality of accumulated path metrics ($PM_1$ and $PM_2$) and a plurality of branch metrics ($BM_1$ and $BM_2$). The decoding apparatus 60 comprises an adder 62, a comparator 64 and a selector 66. In FIG. 6, "0" and "1" are survivor metrics (SM=0 or 1) representing two different survivor paths. The adder 62 comprises adding units 622 and 624 for generating a plurality of calculating results according to the accumulated path metrics and the branch metrics. The comparator 62 comprises comparison units 642, 644 and 646, coupled to the adder 62, for receiving the branch metrics and generating at least one selection signal according to the calculating results and the branch metrics. The selector 66 comprises selecting units 662, 664 and 666, coupled to the comparator 64, for selecting one path within a first survivor path (SM=0) and a second survivor path (SM=1) as the preferred survivor path according to the selection signal. When the difference of the calculation results is smaller than or equal to a predetermined value, the selection signal instructs the selector 66 to output one path having the larger branch metric within the first survivor path and the second survivor path as the preferred survivor path. In a preferred embodiment, the predetermined value can be zero, and the selecting units 662, 664 and 666 can be realized by a multiplexer.

The adding unit 622 receives the branch metric ($BM_1$) and the accumulated path metric ($PM_1$) of the first survivor path, the adding unit 624 receives the branch metric ($BM_2$) and the accumulated path metric ($PM_2$) of the second survivor path, and sums of the two are calculated respectively. The comparison units 646 receives $BM_1+PM_1$ and $BM_2+PM_2$, and the comparison result is inputted to the selecting unit 666 to output the survivor metric (SM). When the difference of two sums (($BM_1+PM_1$)-($BM_2+PM_2$)) determined by the comparison unit 646 is less than or equal to the predetermined value, the selecting unit 666 selects the output result outputted by the selecting unit 662 according to the selection signal S1; otherwise, the selecting unit 666 selects the output result outputted by the selecting unit 664. The comparison unit 644 compares $BM_1+PM_1$ and $BM_2+PM_2$ and generates the selection signal S2 according to the comparison result. When the difference of two sums (($BM_1+PM_1$)-($BM_2+PM_2$)) is larger than the predetermined value, the second survivor path (SM=1) is chosen; otherwise, the first survivor path (SM=0) is chosen, i.e., the smaller accumulated path metric is chosen as the preferred survivor path. The comparison unit 642 compares $BM_1$ and $BM_2$ and generates the selection signal S3 according to the comparison result. When the difference of two branch metrics ($BM_1-BM_2$) is larger than the predetermined value, the first survivor path (SM=0) is chosen; otherwise, the second survivor path (SM=1) is chosen, i.e., the larger branch metric is chosen as the preferred survivor path.

The decoding apparatus according to the embodiment can be applied to convolutional decoding, decoding of combinations of convolutional codes and other coding methods such as Reed-Solomon (RS) code, or Viterbi decoding.

Figure 7:
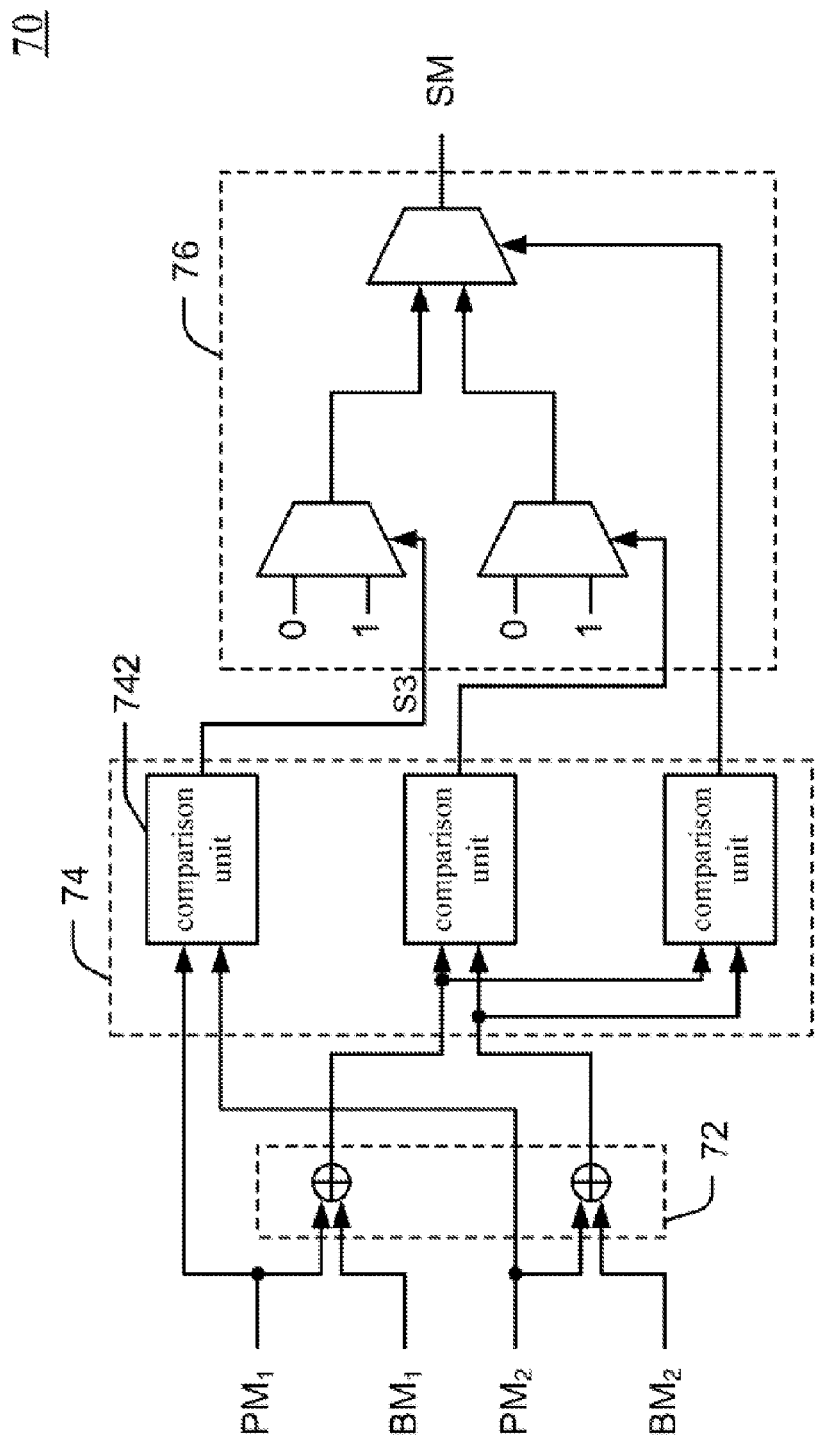
FIG. 7 is a block diagram of a decoding apparatus according to another embodiment of the present disclosure.

FIG. 7 is a block diagram of a decoding apparatus 70 according to another embodiment of the present disclosure. The decoding apparatus 70 comprises an adder 72, a comparator 74 and a selector 76. The components are similar to FIG. 6, and the difference is that the comparison unit 742 compares $PM_1$ and $PM_2$ and generates the selection signal S3 according to the comparison result. When the difference of two accumulated path metrics ($PM_1-PM_2$) is larger than the predetermined value, the second survivor path (SM=1) is chosen; otherwise, the first survivor path (SM=0) is chosen, i.e., the smaller accumulated path metric is chosen as the preferred survivor path. The functions of the rest components are similar to the corresponding components in FIG. 6, so details thereof are not repeated for brevity.

From above, the present disclosure provides a preferred way for determining a survivor path when the difference of the accumulated path metrics in a decoding process is smaller than or equal to a predetermined value. If one of the survivor paths is determined directly instead of particularly handing such situation, possibilities of the other paths being the survivor path are eliminated such that decoding errors may be resulted.

While the present disclosure has been described in terms of what is presently considered to be the most practical and preferred embodiments, it is to be understood that the present disclosure needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A decoding method for determining a preferred survivor path in a decoding process, the method comprising:
    calculating a first determination value of a first survivor path at a first time point, the first determination value being determined by a first sub determination value and a second determination value at a second time point, the second time point being prior to the first time point;
    calculating a third determination value of a second survivor path at the first time point, the third determination value being determined by a second sub determination value and a fourth determination value at the second time point;
    when a difference between the first determination value and the third determination value is equal to or less than a predetermined value, determining the preferred survivor path at the first time point according to the second and the fourth determination values, or the first and the second sub determination values; and
    when a difference between the second determination value and the fourth determination value is less than or equal to the predetermined value, comparing a sub determination value corresponding to the second determination value of the first survivor path with a sub determination value corresponding to the fourth determination value of the second survivor path prior to a present time point, or comparing a determination value of the first survivor path at a previous time point prior to the second time point with a determination value of the second survivor path at the previous time point prior to the second time point until the difference between the individual determination values of the two paths at the same time point is larger than the predetermined value.

2. The method according to claim 1, wherein the first, the second, the third and the fourth determination values are accumulated path metrics.

3. The method according to claim 2, wherein the preferred survivor path corresponds to a smaller of the second determination value and the fourth determination value.

4. The method according to claim 1, wherein the first sub determination value and the second sub determination value are branch metrics.

5. The method according to claim 4, wherein the preferred survivor path corresponds to a larger of the first sub determination value and the second sub determination value.

6. The method according to claim 1, wherein the predetermined value is zero.

7. The method according to claim 1, wherein the decoding process is applied to convolutional decoding.

8. The method according to claim 1, wherein the decoding process is applied to decoding of combinations of convolutional codes and Reed-Solomon (RS) codes.

9. The method according to claim 1, wherein the decoding process is applied to decoding of combinations of convolutional codes and other coding methods.

10. The method according to claim 1, wherein the decoding process is applied to Viterbi decoding.

11. A decoding apparatus for determining a preferred survivor path according to a plurality of accumulated path metrics and a plurality of branch metrics, the apparatus comprising:
    an adder, comprising a plurality of adding units, that generates a plurality of calculation results according to the accumulated path metrics and the branch metrics, the calculation results including:
        a first determination value of a first survivor path at a first time point, the first determination value being determined by a first sub determination value,
        a second determination value at a second time point, the second time point being prior to the first time point,
        a third determination value of a second survivor path at the first time point, the third determination value being determined by a second sub determination value, and
        a fourth determination value at the second time point;
    a comparator, comprising a plurality of comparison units and coupled to the adder, that receives the branch metrics and generates at least one selection signal according to the calculation results and the branch metrics; and
    a selector, coupled to the comparator, that selects one of the first survivor path and the second survivor path as the preferred survivor path according to the at least one selection signal;
    wherein, when a difference of the calculation results is smaller than or equal to a predetermined value, the at least one selection signal instructs the selector to output, from the first survivor path and the second survivor path, one path having a larger branch metric as the preferred survivor path, such that:
        when a difference between the first determination value and the third determination value is less than or equal to a predetermined value, the preferred survivor path is determined at the first time point according to the second and the fourth determination values, or the first and the second sub determination values, and
        when a difference between the second determination value and the fourth determination value is less than or equal to the predetermined value, a sub determination value corresponding to the second determination value of the first survivor path is compared with a sub determination value corresponding to the fourth determination value of the second survivor path prior to a present time point, or a determination value of the first survivor path at a previous time point prior to the second time point is compared with a determination value of the second survivor path at the previous time point prior to the second time point until the difference between the individual determination values of the two paths at the same time point is larger than the predetermined value.

12. The apparatus according to claim 11, wherein the predetermined value is zero.

13. The apparatus according to claim 11, wherein the decoding apparatus is applied to convolutional decoding.

14. The apparatus according to claim 11, wherein the decoding apparatus is applied to decoding of combinations of convolutional codes and Reed-Solomon (RS) codes.

15. The apparatus according to claim 11, wherein the decoding apparatus is applied to decoding of combinations of convolutional codes and other coding methods.

16. The apparatus according to claim 11, wherein the decoding apparatus is applied to Viterbi decoding.

17. A decoding apparatus for determining a preferred survivor path according to a plurality of accumulated path metrics and a plurality of branch metrics, the apparatus comprising:
    an adder, comprising a plurality of adding units, that generates a plurality of calculation results according to the accumulated path metrics and the branch metrics, the calculation results including:
        a first determination value of a first survivor path at a first time point, the first determination value being determined by a first sub determination value,
        a second determination value at a second time point, the second time point being prior to the first time point,
        a third determination value of a second survivor path at the first time point, the third determination value being determined by a second sub determination value, and
        a fourth determination value at the second time point;
    a comparator, comprising a plurality of comparison units and coupled to the adder, that receives the branch metrics and generates at least one selection signal according to the calculation results and the branch metrics; and
    a selector, coupled to the comparator, that selects one of the first survivor path and the second survivor path as the preferred survivor path according to the at least one selection signal;
    wherein, when a difference of the calculation results is smaller than or equal to a predetermined value, the at least one selection signal instructs the selector to output, from the first survivor path and the second survivor path, one path having a smaller accumulated path metric as the preferred survivor path, such that:
        when a difference between the first determination value and the third determination value is less than or equal to a predetermined value, the preferred survivor path is determined at the first time point according to the second and the fourth determination values, or the first and the second sub determination values, and
        when a difference between the second determination value and the fourth determination value is less than or equal to the predetermined value, a sub determination value corresponding to the second determination value of the first survivor path is compared with a sub determination value corresponding to the fourth determination value of the second survivor path prior to a present time point, or a determination value of the first survivor path at a previous time point prior to the second time point is compared with a determination value of the second survivor path at the previous time point prior to the second time point until the difference between the individual determination values of the two paths at the same time point is larger than the predetermined value.

18. The apparatus according to claim 17, wherein the predetermined value is zero.

19. The apparatus according to claim 17, wherein the decoding apparatus is applied to convolutional decoding.

* * * * *